United States Patent [19]

Proudman

[11] Patent Number: 5,246,026
[45] Date of Patent: Sep. 21, 1993

[54] FLUID MEASURING, DILUTION AND DELIVERY SYSTEM

[75] Inventor: Donald L. Proudman, Taunton, Mass.

[73] Assignee: Proudman Systems, Inc., Taunton, Mass.

[21] Appl. No.: 881,811

[22] Filed: May 12, 1992

[51] Int. Cl.$^5$ ............................................. G05D 11/13
[52] U.S. Cl. ................................. 137/3; 137/101.19; 222/57
[58] Field of Search .................. 222/20, 57; 73/196, 73/195; 137/100, 101.19, 7, 3, 101.21

[56] References Cited

U.S. PATENT DOCUMENTS

| | | | |
|---|---|---|---|
| 2,314,152 | 3/1943 | Mallory | 73/156 X |
| 2,641,271 | 6/1953 | Pressler | 73/156 X |
| 3,219,046 | 11/1965 | Waugh | 137/101.19 X |
| 3,229,077 | 1/1966 | Gross | 137/101.19 X |
| 3,438,385 | 4/1969 | Nogami | 137/101.19 |
| 3,762,428 | 10/1973 | Beck | 137/101.19 X |

*Primary Examiner*—Robert G. Nilson
*Attorney, Agent, or Firm*—Edwin H. Paul; Jerry Cohen

[57] ABSTRACT

A device for automatic dilution of chemical additives and water utilizing a single pump (20) drawing water and other chemical additives through a dilution manifold (24). The chemicals are fed through adjustable orifices and valves, and a microprocessor based controller oversees and controls system operation. Two digital flow meters are arranged wherein the controller compares the difference between the flow meters and delivers a desired volume of the chemical additive and water.

7 Claims, 4 Drawing Sheets

FLUID MEASURING, DILUTION AND DELIVERY SYSTEM

FIELD OF THE INVENTION

The present invention relates generally to systems which deliver a mixture of fluids in accurate and precise amounts. The invention has particular application in automatic systems for delivery and dilution of liquid chemicals and water for the cleaning industry and in like applications in other industries.

BACKGROUND OF THE INVENTION

In the cleaning industry there is a need to handle a wide range of liquid chemical, including alkalis, detergents, bleaches, acids and the like. These chemicals have a variety of viscosities and concentrations requiring dilution, usually with water, before use. Moreover, these are harsh, possibly hazardous chemicals requiring special handling, including the need to flush out remnants of the previous chemical from common feed pipes. Many other industries present combinations of such problems.

In use the specific proportions of the various chemicals delivered must be controlled for efficiency, performance, repeatability and low cost.

Known systems pumped the chemical directly into the process equipment for use with peristaltic pumps. The peristaltic pumps are used as the chemicals are viscous. Wear and aging problems with the peristaltic pumps lead to inaccuracies in volume delivered and metering systems were developed. But the flow meters cannot be used with viscous fluids.

To overcome this viscous problem the chemicals are diluted with water enough to allow the flow meters to function properly, but the amount (volume) of chemical added is the critical parameter to be controlled not a diluted chemical. One metering system is in use wherein the dilution is compensated. In this metering system a water supply is pumped into a dilution manifold where a number of different chemicals may be pumped into the flow stream. The chemicals are diluted enough to allow the flow meters to function and the diluted flow is directed from the dilution manifold through a totalizing flow meter to the processing equipment. A system controller, by turning on or off the various chemical pumps, and by measuring the total flow rate, determines the amount of chemicals supplied to the process machines.

In a typical operation, only the water pump is turned on and the flow meter records a given flow rate. When a chemical pump is turned on, the flow meter records a different (higher) flow rate, with the difference accepted to be due to the added chemical volume. By recording the flow rates the controller can determine what volume of each chemical is being delivered.

The above described flow metering system has some limitations. The water pump must deliver a fixed volume and pressure that remains constant when the pumps for the chemicals to be added are activated. If the flow rate of the water pump changes errors are introduced. Control of this pump is done by the system controller turning it on or off. The system controller also turns on or off the chemical pumps and the proportions delivered are determined by programming a differential volume into the system controller. For example, to deliver a given volume of a chemical, the water pump is turned on and the flow rate measured; then a chemical pump is turned on and the flow meter responds with a higher flow rate—the difference, due to the chemical being pumped, is measured until the desired amount of chemical has been added. In this system peristaltic type pumps are still used because the chemicals are viscous and must be injected into the water flow stream at a pressure great enough to overcome the water pressure involved. With such equipment, controlled as described, the actual mixture delivered may vary by considerable amounts. If the chemical feed lines to or from the chemical pumps are partly empty, say due to settling, the volume of chemical delivered will be less than if the feed lines were filled. In addition the peristaltic pumps, wherein rollers squeeze resilient tubes, cause wear and distortions on the tubes and rollers resulting in differences in the rate of delivery as the pumps and tubes wear. As previously described, the system is referenced to the water pump flow rate being constant, but if the water pump changes its flow rate as the chemicals are pumped, say due to high back pressures, or the mixing of the chemical and water is not directly additive, errors are introduced.

Other disadvantages stem from the use of the peristaltic pumps. These pumps are expensive (ten such pumps in a single system are common) and often in need of service to repair worn rollers and replace the feed tubes. The replacement and cleaning of such pumps is labor intensive, and care must be taken when handling harsh chemicals often found in the cleaning industry and in like industries.

The result of these prior art system limitations is that non-uniform mixtures are often obtained and this results, ultimately, in non-uniform cleaning performance or other performance degradation associated with failure to deliver prescribed mixture proportions.

An object of this invention is to produce a system where volumes of fluid chemical additives are reliably achieved with improved safety, accuracy and precision.

It is another object of this invention to eliminate the peristaltic pumps, thereby decreasing cost, and further increasing reliability and decreasing service requirements.

It is a further object of this invention to provide a system with fewer service requirements and long life.

Another object of this invention is to provide a system that may control many processing machines.

Another object of this invention is to tailor the hydraulic flow path to the specific liquids being delivered in order to compensate for different viscosities and flow requirements.

SUMMARY OF THE INVENTION

The foregoing objects are met in a new system with a single pump, two flow meters and valves and adjustable flow orifices in the feed line for at least one chemical additive and the water feed line. The orifices are adjusted for one or more parameters of flow of that specific chemical (in a preferred embodiment, the adjustment is for viscosity and flow rate).

A pumping means (in a preferred embodiment a single pump) delivers the mixture for use. The water and the chemical feed lines are connected through a dilution manifold to the inlet side of the pump—the pump is drawing the fluids from the dilution manifold. One flow meter monitors the water flow from its supply, while a second flow meter monitors the total flow of water and chemicals. After appropriate calibration, the difference between these two flow meters is a measure of the volume of the chemical additive.

In a preferred embodiment a desired volume of a chemical is input into a system controller as a digital number. The controller monitors the totalizing flow meter and the water flow meter and turns on the valve for the chemical additive. Then, the controller monitors the difference between the water flow meter and the totalizing flow meter. The difference is the volume of the chemical additive. The appropriate chemical valve remains on and the flows are monitored until the desired volume is reached, then the valve is turned off.

After delivery of the chemical additive the main feed lines may be flushed by drawing only water through the system lines.

In another preferred embodiment the system controller is connected to many process machines that are receiving the water and chemical mixtures, and the system controller may be arranged and constructed to control multiple systems configured as in the present invention.

Other objects, features and advantages will be apparent from the following detailed description of preferred embodiments thereof taken in conjunction with the accompanying drawing in which:

DETAILED DESCRIPTION OF PREFERRED EMBODIMENTS

Figure 1:
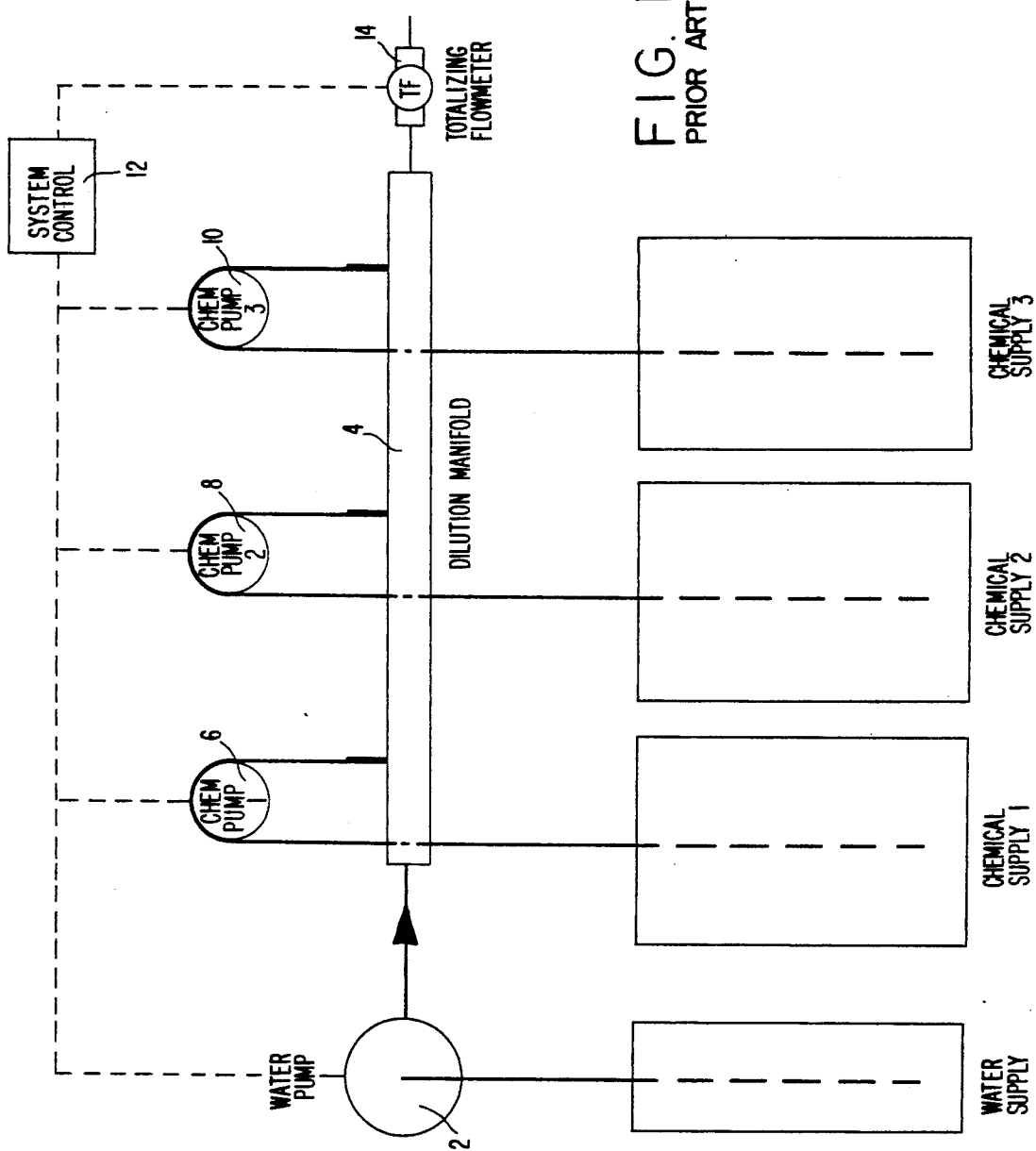
FIG. 1 is a schematic of a prior art system.

In FIG. 1, a prior art system, a water pump 2 draws water from a source and delivers the water to a dilution manifold 4. Peristaltic pumps 6, 8 and 10 draw specific chemical additives from three supply sources and delivers the chemicals to the dilution manifold. The system controller 12 turns the pumps on or off and measures flow via the totalizing flow meter 14 that is placed in the flow output from the dilution manifold.

In a preferred operation the controller turns on the water pump and measures the volume flow to establish a base volume flow. When a chemical pump is turned on, the total flow rate increase is a measure of the additive delivered when compared to the base flow rate.

In a preferred embodiment the flow meter provides a digital signal when a specific volume of fluid has passed through the flow meter, but analog flow meters, meters where the output signal indicates flow rate, and "smart" totalizing flow meters, where the meter will output a signal indicating the total flow through the meter when queried (sampled) and/or the meter will accept an total flow input and output a signal when that flow was achieved may be used in the present invention. In addition flow meters with optical interfaces are provided in another preferred embodiment. The rest of the system would be changed to accommodate these other types of flow meters and the like.

Figure 2A:
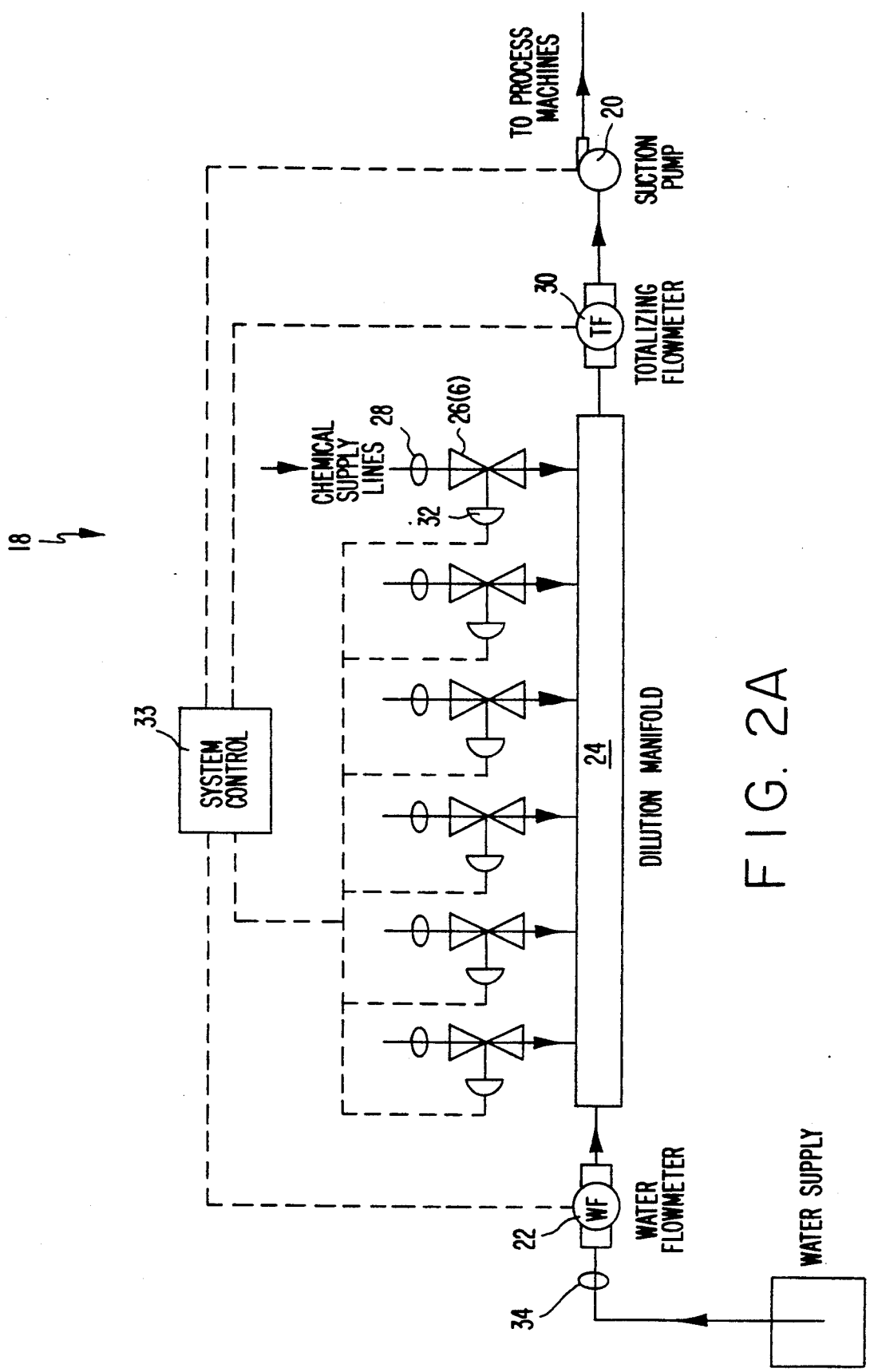
FIG. 2A is a schematic diagram of a first preferred embodiment of the present invention.

FIG. 2A shows a preferred embodiment of a system 18 in accordance with a first preferred embodiment of the present invention. Here a pump 20 delivers liquid to users, that, in a preferred embodiment, are multiple processing systems. The inlet side of the pump draws fluids from a dilution manifold 24 through a flow meter 30 which monitors the total fluid flow. Water enters the manifold through a fixed or adjustable orifice 34, through the water flow meter 22, and six chemicals enter the dilution manifold through inlet valves 26. Alternatively, ten or more chemical may be fed into the dilution manifold, and in yet another preferred embodiment each chemical inlet line will contain a fixed or adjustable orifice 28 positioned before or after the inlet valve. Six interface units 32 allow the system controller 33 to turn each valve on or off in any sequence and combination.

Preferably, the system controller is a computer, preferably including a microprocessor, with supporting circuitry and programming which controls the dilution system of the present invention while also controlling the distribution of the mixture to coordinating machinery associated with the total washing or processing system. In other preferred embodiments the controller may be a remote large computer that controls the entire facility operation, or small computers networked, or sequential time based controllers. Many other preferred controller designs, known in the art, may be used to advantage within this invention.

The flow meters 22 and 30 provide a pulse when a given volume is delivered through the flow meter. In this preferred embodiment the dilution with water allows the pump and flow meters to function within their specifications. The flow meters are linear when operating within their specifications for viscosity and flow; the flow rate specification for the flow meters used in a preferred embodiment are from about 0.5 to about 6 gallons per minute, other preferred embodiments utilize meters with flow rates from about 1.0 to over about 30 gallons per minute, and the adjustment for the orifices involved allow the chemical to be diluted with water to keep the flow rates and viscosities within the specifications of the flow meters involved. The pumps are sized to accommodate the flow rate characteristics of the meters.

Figure 2B:
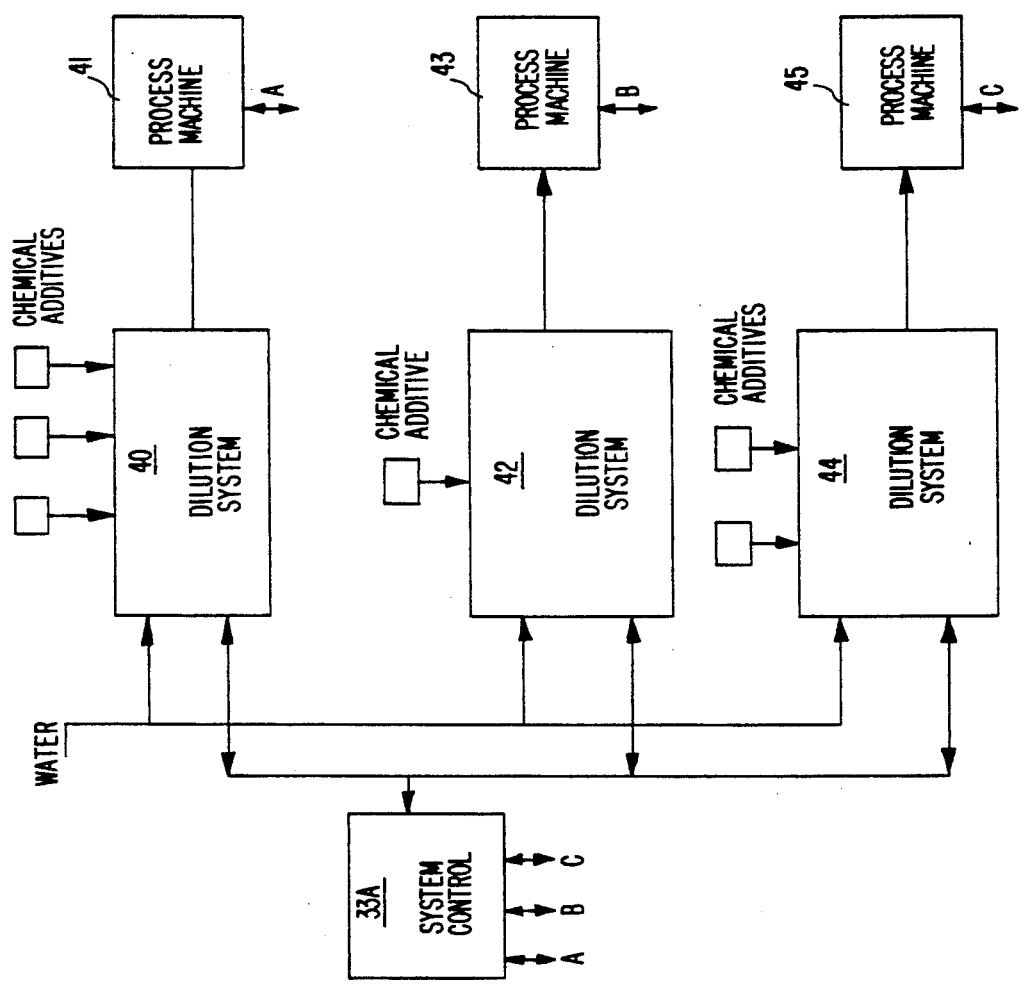
FIG. 2B is a schematic block diagram of a second preferred embodiment.

FIG. 2B show the system controller 33A controlling a plurality of cleaning systems. Three cleaning systems are shown comprising dilution systems 40, 42, 44, and corresponding process machine 41, 43 and 45. The system controller communicates with the dilution systems, and, via inputs A, B and C, with the process machines such that each cleaning system is independently operated and controlled essentially in parallel.

Figure 2C:
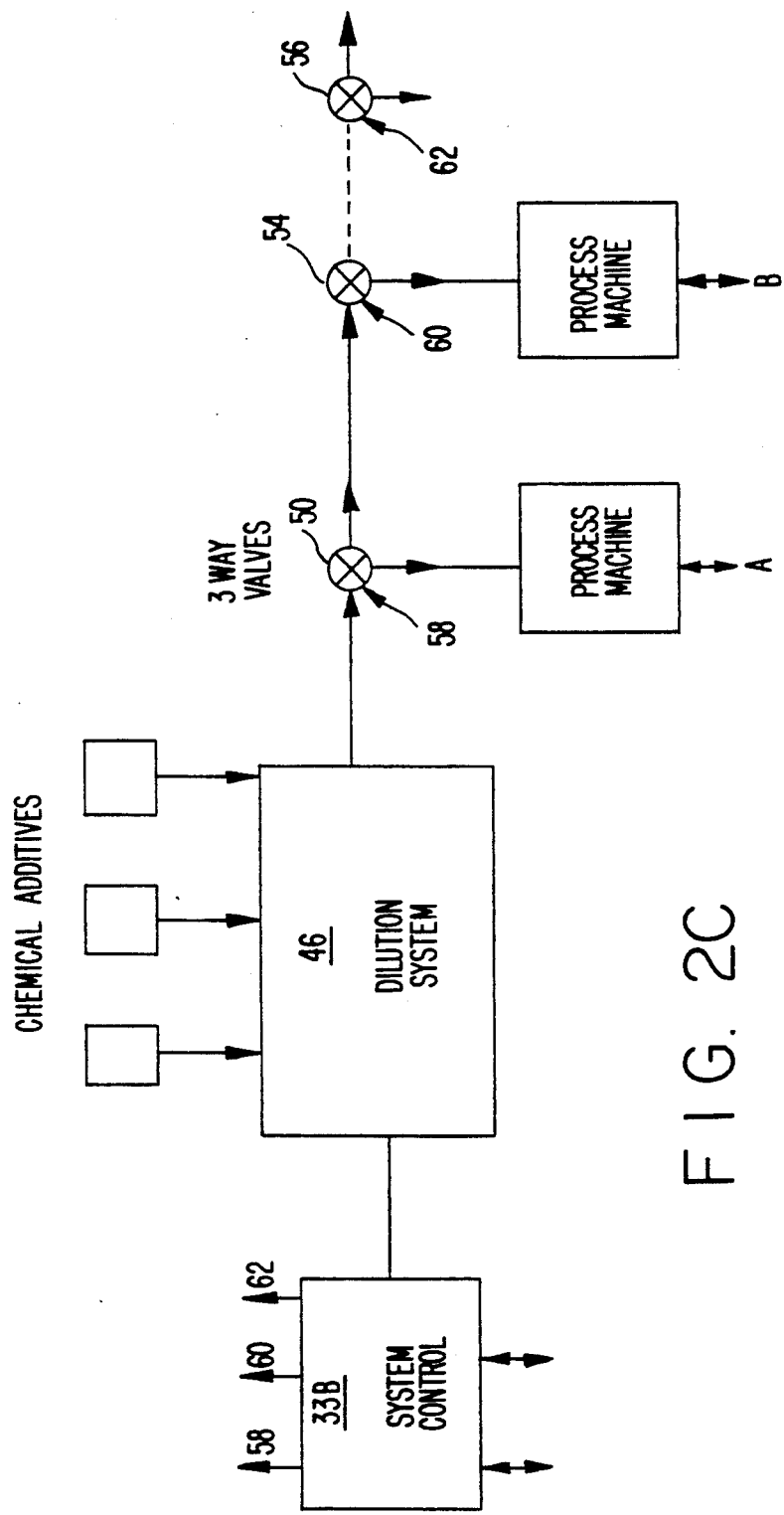
FIG. 2C is system block/schematic diagram of serial arrangement of dilution system controlling several process machines.

FIG. 2C shows a cost effective serial arrangement of a single controller 33B and a single dilution system 46 controlling several process machines (two shown). This is a serial arrangement wherein each system must wait for the completion of the chemical additives requested by another system. The requests come in and are placed in a logic stack within the controller. Each requesting process machine is satisfied in the order that the requests were recieved until all have been satisfied. The three way valves 50, 54 and 56, under the control of the controller via connections 58, 60 and 62, divert the flow to the prcess machine being loaded with the requested chemicals, and when complete the valve directs the flow down to the next three way valve and so on.

Other preferred embodiments may include multiple flow meters in each line, and continuously controllable orifices in the feed lines.

A typical sequence of operation of the FIG. 2A embodiment is:

1) A request for a specific volume of a particular chemical is input to the system controller 33 from a user machine (not shown) or from a process machine or manually.

2) The pump 20 is turned on drawing water from the supply through the water flow meter 22, through the dilution manifold 24, through the totalizing flow meter 30 to the input side of the pump 20 and then out to the process system.

3.1) The orifices 28 for the various chemicals were previously set to accommodate the viscosity and flow rate range for each chemical to be used.

3.2) The orifice 32 size for the water flow meter is calculated and adjusted operation.

4) With all chemical valves 26 off only water flows through both meters which are measured by the controller 33 which ensures that the flow meters are functioning properly, and are within an acceptable tolerance of each other. An alarm will be activated if they are out of tolerance.

5) The appropriate chemical valve is opened and that chemical is drawn through the dilution manifold 24 and mixed with the water flow stream.

6) The chemical adds to the water stream and the flow through the totalizing flow meter increases, the flow through the water flow meter 22 may decrease depending upon the water orifice size, the chemical orifice size, the pump volume and the mixing characteristics of the water and chemical involved.

7) The controller monitors the volume through both flow meters, calculates the difference between the flow meters and thereby determines the individual volumes of the water and the chemical being delivered by the pump.

8) The controller keeps the valve open until the desired volume of chemical has been delivered. Specifically, the corrected volume difference from step 7 is a digital volumetric measure of the chemical being delivered.

9) After the valve is closed the water will flush out the main deliver lines and the dilution manifold. The volume of flush water may also be controlled.

The FIG. 2B embodiment each system 40, 42, 44 would have the same sequence as shown above, but the systems would not each be on the same sequence step. The system controller 33A would monitor, track and control each of these systems, no matter which step any system is performing, ensuring that each system functions properly and independently.

In practice the pump may change its delivery rate, but since the system measures the corrected difference between the flow meters the pump variation is cancelled, and, similarly, the chemical introduction may vary without affecting the system volume delivery accuracy.

As previously described, the prior art system, in contrast to the above invention, introduces errors if the water supply pump varies in delivery performance or as air enters the delivery tubes involved.

It will now be apparent to those skilled in the art that other embodiments, improvements, details and uses can be made consistent with the invention.

What is claimed is:

1. A liquid dilution and delivery system for a plurality of processing systems comprising:
   (a) means for pumping liquid with at least one input and one output,
   (b) dilution means with at least two fluid inputs and one fluid output connected to the input of the pumping means, wherein fluids entering two or more inputs commingle and flow out from the dilution means into said pumping means,
   (c) means for determining the volume flow of at least one of the fluid inputs to the dilution means,
   (d) flow meter means, downstream from the output of said dilution means, for determining the total volume delivered by the pumping means wherein said flow meter means generates pulses, wherein each pulse represent a given volume,
   (e) valving means for restricting the fluid flow in at least one of the fluid inputs,
   (f) means for controlling the pump means and valving means, and for (i) recording the flow meter pulses, (ii) determining the volumes of the liquids entering the dilution means by comparing the total volume flow to the volume flow of one said fluid input, (iii) turning on said valving means, and (iv) at a later time turning off that valving means when the desired volume flow through the one fluid input is achieved,
   (g) means defining adjustable orifices in at least one fluid input to the dilution means, wherein the orifice is adjusted to accommodate the viscosity and flow rate of the fluid being delivered through the adjustable orifice,
   (h) input means, through which desired specific chemical additive volumes are requested from each of said processing systems by inputting the requests into said means for controlling, and
   (i) output valving means, responsive to said means for controlling, wherein said output valving mans provides the desired specific chemical volume, as requested, to each said corresponding processing system.

2. A liquid dilution and delivery system comprising:
   (a) liquid pumping means with at least one input and one output,
   (b) dilution means with at least two fluid inputs and one fluid output connected to the input of said pumping means, wherein fluids entering two or more inputs commingle and flow out from the dilution means,
   (c) means for determining the volume flow of at least one of the fluid inputs to the dilution means,
   (d) means for determining the total volume flow delivered by the pump means,
   valving mans in one of the inputs of the dilution means, and
   (e) means for comparing and for controlling the pump means, wherein the volumes of the liquids entering the dilution means are determined by comparing the total volume to the volume of said one fluid input.

3. A system as defined in claim 2 further comprising: adjustable orifices in at least one fluid input to the dilution means, wherein the orifice is adjusted to accommodate the viscosity and flow rate of the fluid being delivered through the adjustable orifice.

4. A system as defined in claim 2 wherein both said means for determining flow pulses, and wherein said means for controlling and means for comparing, comprises: a microprocessor controller wherein said controller also provides means for recording said pulses.

5. A system as defined in claim 4 further comprising:

controller output means for controlling said valving means, wherein the microprocessor controller turns on said valving means, determines the flow through said valving means from said comparing means, and at a later time turns off said valving means, whereby the total volume of fluid delivered through said valving means is determined.

6. A system as defined in claim 5, wherein said pump means delivers flow to processing systems, wherein said controller means further comprises:

second control means providing control for a plurality of dilution and delivery systems, and input means through which requisitions of desired chemical additive volumes are input into said microprocessor means from said plurality of processing systems.

7. A process for liquid dilution and delivery comprising the steps of:

(a) pumping liquid from at least one input to an output, (b) diluting at least two fluid inputs and outputting the commingled flow, (c) determining the volume flow of at least one of the fluid inputs being diluted with a first flow meter, (d) determining the total volume being pumped with a second flow meter, wherein said flow meters generates pulses, wherein each pulse represent a given volume, (e) restricting the fluid flow in at least one of the fluid inputs, (f) controlling the pumping and flow restricting, (g) recording the flow meter pulses, (h) determining the volumes of the liquids entering the dilution means by comparing the total volume flow to the volume flow of one fluid input, (i) turning on a valve, and at a later time turning off that valve when the desired volume flow through the one fluid input is achieved, (g) adjusting orifices in at least one fluid input, wherein the orifice is adjusted to accommodate the viscosity and flow rate of the fluid being delivered through the adjustable orifice, and (h) inputting desired chemical additive volumes, wherein said controlling provides for a plurality of dilution and delivery processes.

* * * * *